CHARLES BELSKY
WILLARD J. HERSHEY
INVENTORS

BY John R. Faulkner
John J. Roethel
ATTORNEYS

Dec. 27, 1966  C. BELSKY ET AL  3,294,437
PIVOTING SECOND SEAT

Filed Jan. 11, 1965  2 Sheets-Sheet 2

CHARLES BELSKY
WILLARD J. HERSHEY
INVENTORS

BY John R. Faulkner
John J. Roethel
ATTORNEYS

United States Patent Office 3,294,437
Patented Dec. 27, 1966

3,294,437
PIVOTING SECOND SEAT
Charles Belsky and Willard J. Hershey, Detroit, Mich., assignors to The Ford Motor Company, Dearborn, Mich., a corporation of Delaware
Filed Jan. 11, 1965, Ser. No. 424,503
3 Claims. (Cl. 296—65)

This invention relates generally to vehicle seat structures and more particularly to vehicle seat structures constructed and arranged for swinging movement to provide increased access to a seating and storage area to the rear thereof.

The present invention incorporates many of the features of the seat structure disclosed in Willard J. Hershey U.S. Patent 2,987,344. As explained in that patent, station wagons of the type having front, intermediate, and front facing rear seats are usually provided with two doors on each side. The front doors are in general alignment with the front seat and the rear doors are in general alignment with the intermediate seat. Egress and ingress to the rear seat has always presented a problem. The intermediate seat and the wheelhouse located rearwardly of the rear door opening in the body both present obstacles to easy access to the rear seat. In early station wagons, it was customary for the intermediate seat to be considerably narrower than the body width to provide sufficient space between the end of the seat and the adjacent wheelhouse for the passage of passengers to and from the rear seat. This, of course, limited the number of persons that could be comfortably carried on the intermediate seat.

An object of the aforesaid U.S. Patent 2,987,344 is to provide an improved construction and arrangement for the intermediate seat of the station wagon type vehicle. The improved seat structure embodies a main seat frame which extends transversely of the vehicle body. This main seat frame is supported on the vehicle body floor panel for swinging movement in a plane parallel to the floor panel. It has an auxiliary seat assembly having a seat cushion attached thereto pivotally connected at its forward portion to the main seat frame adjacent the forward edge of the latter. A seat back assembly, also provided with a cushion is pivotally connected at its lower end to the main seat frame adjacent the rear edge of the latter. The seat back assembly is selectively swingable about one or the other of two spaced pivot axes, the selected axis being controlled by a latch means. When swingable about one spaced axis, the seat back frame is operatively connected by a link means to the floor panel and is effective upon being swung in a forward direction to swing the seat structure in a horizontal plane to a forwardly angularly displaced position relative to its normal transversely extending position. Upon the latch means being released, the seat back frame is uncoupled from the link means and is freely swingable forwardly about its pivot axis into a horizontal storage position over the main seat frame. The only requirement is that before the seat back frame can be swung into a storage position over the main seat frame, the auxiliary seat frame has to be swung about its pivotal connection to the main seat frame to a storage position forward of the latter.

The present invention incorporates many of the features above described, it being an object of the present invention to provide an improved driving mechanism for translating swinging movement of the seat back frame into swinging movement of the seat structure in a horizontal plane to a forwardly angularly displaced position relative to its normal transversely extending position. In the present invention, when the seat back is actuated, swinging movement of the seat back results in a pulling force being exerted on a rod which is parallel to the longitudinal axis of the vehicle body. This rod in turn swings a normal and flat link resulting in a forward swinging movement of the seat assembly. The seat is pivoted at one end for swinging movement about a vertical axis and moves on a pair of rollers located at the other end, one of the rollers being attached to the seat frame and the other being mounted on the vehicle floor. A latch mechanism holds the seat back in its normal seating position and, when unlatched, the seat back and seat pads can be folded to make a load floor. The seat assembly is stabilized by means of a fixed bracket which slides along a cross member beneath the seat and prevents the seat from tilting back. The unique feature of the design is that the linkages, rollers, slide and track are all concealed below the seat cushion, and in forwardly angularly displaced position of the seat there is no obstruction in the entrance or exit passageway.

Other objects and advantages of this description will be made more apparent as the description proceeds, particularly when considered in connection with the accompanied drawings, wherein.

Figure 1:
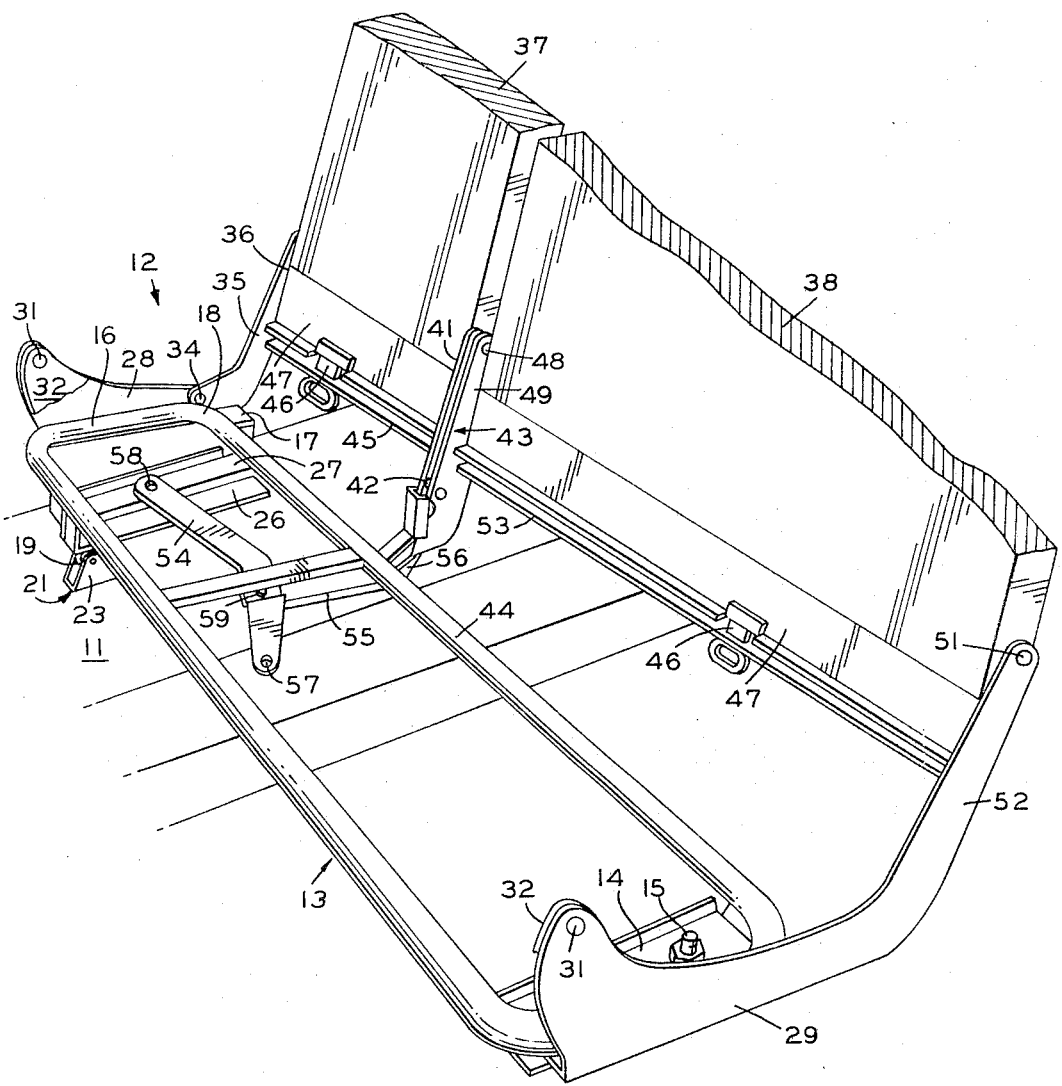
FIG. 1 is a perspective view of the vehicle seat embodying the present invention shown in normal seating position, the cushions having been omitted since only the seat frame structure is directly involved in the present invention.

Referring now to the drawings, the reference character 11 indicates the floor panel of a vehicle body of a station wagon type. The portion of the floor panel shown is that directly behind the front seat (not shown) and forward of the rear wheelhousings of the vehicle body (not shown). Supported on this portion of the floor panel is the second or intermediate seat, generally designated 12, to which the present invention relates. It will be understood that access to this second or intermediate seat is through a side door (not shown) of the vehicle body, the door being substantially in alignment with this seat. Access to the rear or third seat or to the cargo carrying area of the station wagon body is also through this same side door. Reference may be made to U.S. Patent 2,677,574, which, although it illustrates an older model vehicle, represents the general construction and arrangement to be found in many current model station wagons and is of the type to which the present invention is directed.

The station wagon second or intermediate seat structure 12 embodying the present invention comprises a main frame 13 which is illustrated as being formed of tubular steel. This main frame 13 is supported in a slightly elevated position relative to the floor panel 11 for swinging or swiveling movement in a plane substantially parallel to the plane of the floor panel 11. The swinging or swiveling movement is about a pivot axis located at the left rear corner of the seat structure. It should be noted that the location of the pivot axis is with reference to the installed position of the seat structure when in a conventional vehicle manufacture for the United States market. If, as in some European countries, the rear door located on the left side of the vehicle would be the door primarily used by passengers entering or leaving the vehicle, the pivot axis could be located at the right rear corner of the seat structure with a corresponding reversal of other parts of the structure.

The structure supporting the main frame 13 in elevated swingable relationship to the floor panel 11 comprises a channel-shaped member 14 secured to the underside of the frame 13. The member 14 sits on an inverted channel-shaped member (not visible) and is bolted thereto through a pivot or shoulder stud 15. (Reference may be made to the aforementioned Patent 2,987,344 for a more detailed description of the pivot structure for supporting the one end of the seat frame 13.) Although the manner in which the frame 13 is pivotally supported on the floor 11 is a matter of design, the importance of the stud 15 is that it defines the axis about which the seat structure is swingable in a plane parallel to the floor panel 11.

Figure 3:
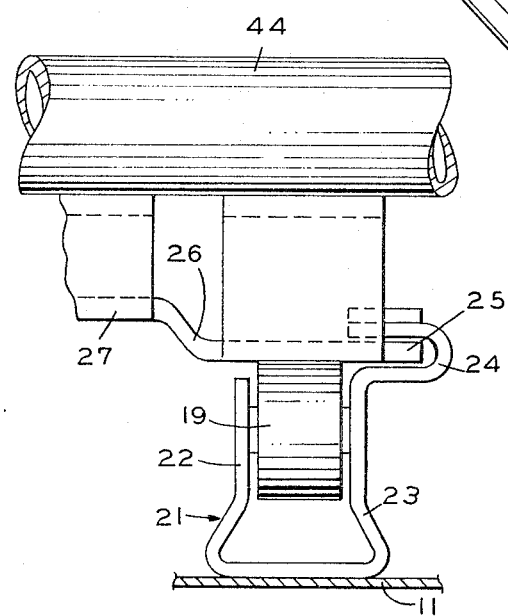
FIG. 3 is an enlarged detail illustrating the manner in which the seat frame is supported on the floor mounted roller for movement in a fore and aft direction.

The end 16 of the main frame 13 (the end opposite that coupled to the pivot stud 15) is supported for movement on two rollers. One of the rollers (not visible) is housed beneath a bracket 17 seen at the rear right corner 18 of the seat frame 13. This roller is adapted to roll over the surface of the floor pan 11 and functions primarily as a stabilizing roller. More important is the roller 19 journalled in the bracket 21 secured to the vehicle floor panel 11 (see FIG. 3). The bracket 21 is substantially U-shaped with the roller 19 being journalled between the upstanding legs 22 and 23. The upstanding leg 23 terminates in a U-shaped flange 24 which is adapted to receive therebetween a lateral extension 25 of a track member 26 secured to the underside of the seat frame.

Figure 2:
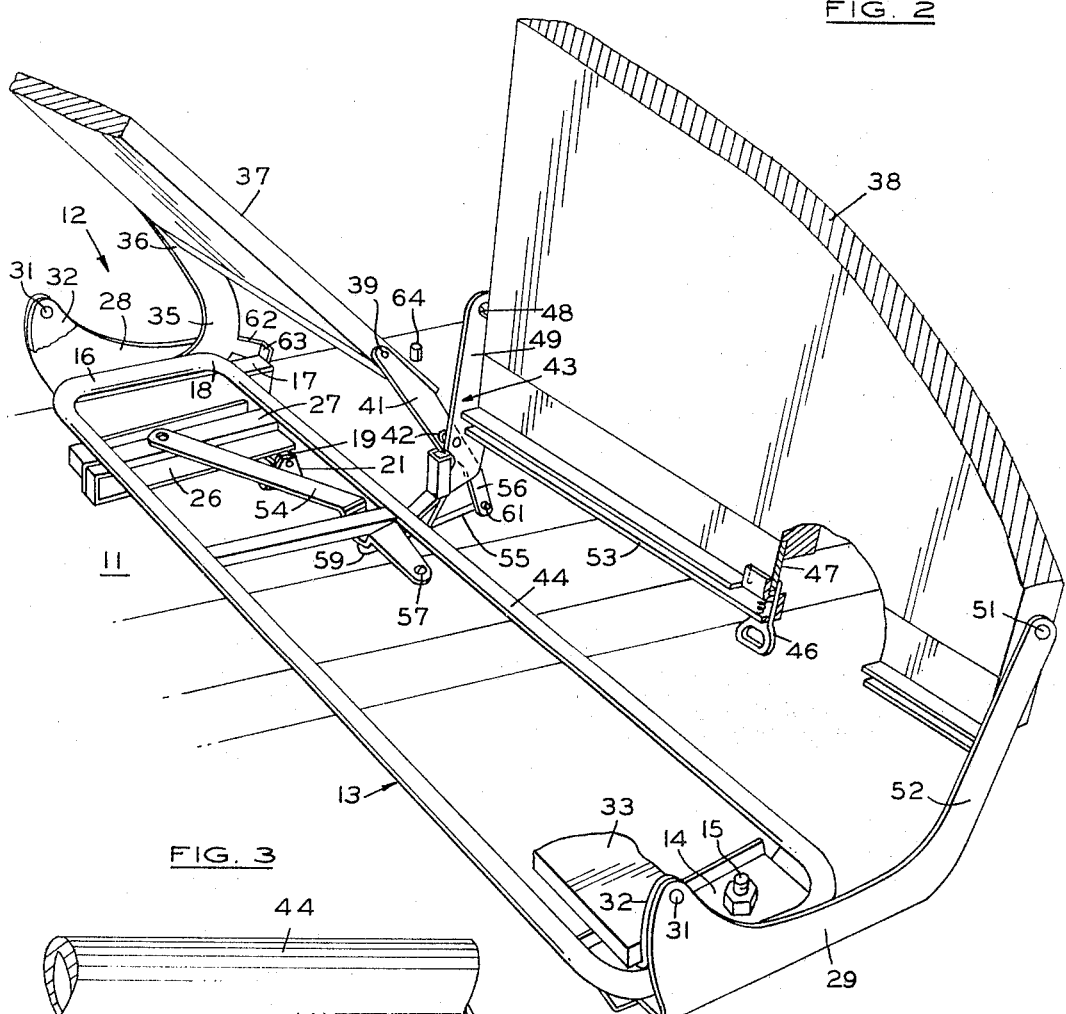
FIG. 2 is a view in part similar to FIG. 1 looking at the seat structure in its angularly forwardly displaced position.

In operation, the roller 19 engages the under surface of the track member 26 as the seat swings about the pivot axis 15. The track member 26 is provided with a stepped portion 27, for a purpose to be explained. At each of its sides the main frame 13 has welded or otherwise securely fastened thereto upright flange members 28 and 29, the flange member 28 being located at the right end of the main frame and the flange member 29 being located at the left end. Both flange members receive at their upper forward corners a pivot stud 31. Pivotally connected to each flange 28 and 29 by the pivot studs 31 are brackets 32 located at each end of the seat cushion structure. Only a fragmentary portion of each bracket 32 is shown. As can be seen in FIG. 2, a panel 33 extends between the brackets. As explained in Patent 2,987,344, the seat cushion is supported on this panel 33 which is adapted to serve as an auxiliary floor board. When the panel 33 with the seat cushion thereon is swung in a counterclockwise direction about the pivot axis formed by the pivot studs 31, the seat cushion becomes positionable in a storage position forwardly of the main seat frame with the panel 33 extending in a substantially horizontal direction to provide part of the cargo carrying area of the station wagon.

At its rear end, the flange member 28 receives a second pivot stud 34. A hinge member 35 is pivotally connected to the flange member 28 by this pivot stud 34. The upper end 36 of the hinge member 35 is pivotally coupled to a panel 37 forming part of the seat back assembly.

In its preferred embodiment, the seat back structure of the present invention is of two-piece construction and comprises the seat back panel 37 and a seat back panel 38.

As described above, the outboard edge of the panel 37 is pivotally supported on the upper end 36 of the hinge member 35. The inner edge of the panel 37 is pivotally supported by a stud 39 on the upper end of a hinge member 41. The latter is pivotally mounted intermediate its ends on a pivot stud 42 fixed to a substantially L-shaped bracket 43 secured to and projecting upwardly from beneath the rear frame member 44 of the seat frame 13.

The two hinge members 35 and 41 are rigidly connected to each other by a cross member 45. Intermediate the ends of the cross member 45 a spring loaded latch device 46 is mounted that is adapted to engage a flange 47 located on the bottom edge of the panel 37. When the panel 37 is latched to the hinge members 35 and 41 as shown in FIG. 1, the panel can only be swung about a hinge axis defined by the pivot studs 34 and 42, see FIG. 2. When the latch mechanism 46 is disengaged from the striker or keeper device 47, the panel 37 is swingable about a pivot axis defined by the pivot stud (not visible) at the upper end 36 of the hinge member 35 and the pivot stud 39.

The panel 38 is supported at its inboard edge on a pivot stud 48 carried on the upper end 49 of the L-shaped bracket 43 and at its outboard edge on a pivot stud 51 carried on an upward extension 57 of the side flange 29.

The space between the bracket 43 and the upstanding extension 52 of the side flange 29 is bridged by a channel section 53 which provides a support for a second latch device 46. This second latch device 46 controls the upright position of the seat back assembly represented by the panel 38. The latter is pivotable only about the pivot axis formed by the studs 48 and 51 so that upon disengagement of the latch device 46 it may be swung into a substantially horizontal position forming part of the load carrying floor for the station wagon.

The mechanism for bodily swinging the seat structure about the vertical pivot axis 15 will now be described. Basically, this mechanism comprises a link 54, a connecting rod 55 and a downwardly depending extension 56 on the hinge member 41. The link 54 is journalled at one end thereof on a pivot stud 57 secured to the vehicle floor 11. At its opposite end the link 54 is pivotally connected by a pivot stud 58 to the stepped portion 27 of the cross member 26 which is secured to the seat main frame 13. It will be noted that the link 54 has two angularly related sections. One end 59 of the connecting rod 55 is pivotally coupled to the link 54 adjacent the juncture of the two angularly related sections. Suitable means such as a cotter pin or the like retains the rod end 59 in coupled relationship to the link 54. The other end of the connecting rod 55 has a right angled extension 61 which projects through an aperture in the extension 56 of a hinge member 41.

The foregoing construction and arrangement provides a system having a high mechanical advantage. If it is desired to move the seat structure from the position shown in FIG. 1 to the position shown in FIG. 2 so that increased access area to the rear of the seat will be provided, it is only necessary to push or pull the upper edge of the panel 37 in a forward direction. The effect of this is that the seat structure is pushed forwardly with respect to the pivot axis 57 about which the link 54 swings. The pushing force is transmitted from the seat back 37 through the pivot stud 42 through the L-shaped backet 43 to the seat frame 13. There is a forward counterclockwise swinging movement of the link 54 as it adjusts for the angular change in the position of the seat frame 13. In effect, a powerful scissor action is created between the frame member 44 and the link 54 which permits the seat structure to be moved forwardly even if two persons are occupying the seat in front of the seat back assembly represented by the panel 38. To restore the seat to its FIG. 1 position, it is only necessary to push or pull back on the seat back assembly represented by the panel 37.

The hinge member 35 is provided with a downward extension 62 having an inwardly turned flange portion 63 which in upright position of the panel 37 is adapted to abut a stop 64 on the vehicle floor. Except for the stop 64, all of the linkages, rollers, slide and track are concealed below the seat cushion or seat frame structure 13 and there is no obstruction in the entrance or exit passageway to the rear of the vehicle.

It will be understood that the invention is not to be limited to the exact construction shown and described, but

We claim:
1. In a vehicle body having a supporting floor structure; a seat structure having a horizontal seat frame extending transversely of said vehicle body; means supporting said seat frame on said floor structure for swinging movement over said floor structure about a substantially vertical pivot axis located at one end of said seat frame; a seat back assembly; means pivotally supporting at least a part of said seat back assembly superjacent the rear edge of said seat frame; said seat back assembly part being forwardly swingable over said seat frame on said pivot means; and drive means interposed between said seat frame and floor structure comprising a link extending longitudinally of said seat frame for movement in a horizontal plane, said link being coupled at one of its ends to said floor structure intermediate the ends of said seat frame and at its other end to said seat frame intermediate said one end and the other end of said seat frame, and a connecting rod extending between said link means and said swingable seat back assembly part; said connecting rod being coupled to said link means intermediate the ends of the latter; said drive means being operative upon said seat back assembly part being forwardly swung on its pivot means to swing said link means about its coupling to said floor in a direction to swing said seat structure about said vertical pivot axis to a forwardly angularly displaced position relative to its transversely extending position.

2. In a vehicle body having a supporting floor structure; a seat structure having a horizontal seat frame extending transversely of said vehicle body; means supporting said seat frame on said floor structure for swinging movement in a horizontal plane about a substantially vertical pivot axis located at one end of said seat frame; a seat back assembly; hinge means pivotally supporting at least a part of said seat back assembly superjacent the rear edge of said seat frame for forward swinging movement over said seat frame about an axis extending transversely of said vehicle body; and drive means interposed between said seat frame and floor structure comprising a link extending longitudinally of said seat frame and coupled at one of its ends to said floor structure intermediate the ends of said seat frame and at its other end to said seat frame adjacent the end of the latter opposite its pivoted end, said link being movable in a substantially horizontal plane, and a connecting rod coupling said link means to a depending extension of said seat back hinge means; said connecting rod being coupled to said link means intermediate the ends of the latter; said drive means being operative upon said seat back assembly part being forwardly swung on its supporting hinge means to swing said seat structure about said vertical pivot axis to a forwardly angularly displaced position relative to its transversely extending position.

3. In a vehicle body according to claim 2 in which the means supporting said seat frame on said floor structure includes: a roller means mounted on said floor structure; track means interposed between said seat frame and roller means; and stabilizing means interlocking said seat frame and roller means to prevent tilting of said seat frame as it swings about the vertical axis.

References Cited by the Examiner
UNITED STATES PATENTS

| | | | |
|---|---|---|---|
| 2,677,574 | 5/1954 | Golubics | 296—66 |
| 2,987,344 | 6/1961 | Hershey | 296—66 |
| 3,071,407 | 1/1963 | Sloan | 296—65 |

MILTON BUCHLER, *Primary Examiner.*

BENJAMIN HERSH, *Examiner.*

J. H. BRANNEN, *Assistant Examiner.*